US007727510B2

(12) United States Patent
Van Buuren

(10) Patent No.: US 7,727,510 B2
(45) Date of Patent: Jun. 1, 2010

(54) METHOD OF AND APPARATUS FOR SIMULATING A BIOLOGICAL HEAP LEACHING PROCESS

(75) Inventor: Craig Van Buuren, Randburg (ZA)

(73) Assignee: BHP Billiton SA Limited, Randburg (ZA)

( * ) Notice: Subject to any disclaimer, the term of this patent is extended or adjusted under 35 U.S.C. 154(b) by 893 days.

(21) Appl. No.: 10/796,557

(22) Filed: Mar. 9, 2004

(65) Prior Publication Data

US 2005/0136527 A1    Jun. 23, 2005

(30) Foreign Application Priority Data

Dec. 23, 2003  (ZA) ................... 2003/9936

(51) Int. Cl.
    *B01F 1/00* (2006.01)
(52) U.S. Cl. .............. 423/658.5; 423/27; 423/150.1; 435/262
(58) Field of Classification Search ............ 435/262, 435/286.1, 289.1, 294.1, 266.1; 423/658.5, 423/DIG. 17, 658.8, 27, 150.1; 75/744
    See application file for complete search history.

(56) References Cited

U.S. PATENT DOCUMENTS 4,974,816 A    12/1990  O'Connor et al. .......... 266/168
5,242,643 A    9/1993   Kim et al. ................. 422/129
6,063,158 A    5/2000   Sharp et al. ............... 75/743
2005/0211019 A1 *  9/2005  Crundwell et al. ........... 75/375

FOREIGN PATENT DOCUMENTS

| DE | 287267 A5 | 2/1991 |
| JP | 60164476 | 8/1985 |
| KR | 2004015894 | 2/2004 |
| SU | 472336 | 5/1975 |
| WO | WO 01/18262 A2 | 3/2001 |

OTHER PUBLICATIONS

Pennsylvania Department of Environmental Protection, Coal Mine Drainage Prediction and Pollution Prevention in Pennsylvania, Oct. 1998, The Pennsylvania Department of Environmental Protection, Chapter 7, 36-37.*

* cited by examiner

*Primary Examiner*—Stanley Silverman
*Assistant Examiner*—James Fiorito
(74) *Attorney, Agent, or Firm*—Brinks Hofer Gilson & Lione; G. Peter Nichols

(57) ABSTRACT

A microbiological heap leaching simulation process wherein material, representative of ore in a heap, is microbiologically leached in a housing and the temperature of the material at a plurality of locations in the housing is monitored and controlled to reduce heat loss from the housing.

11 Claims, 1 Drawing Sheet

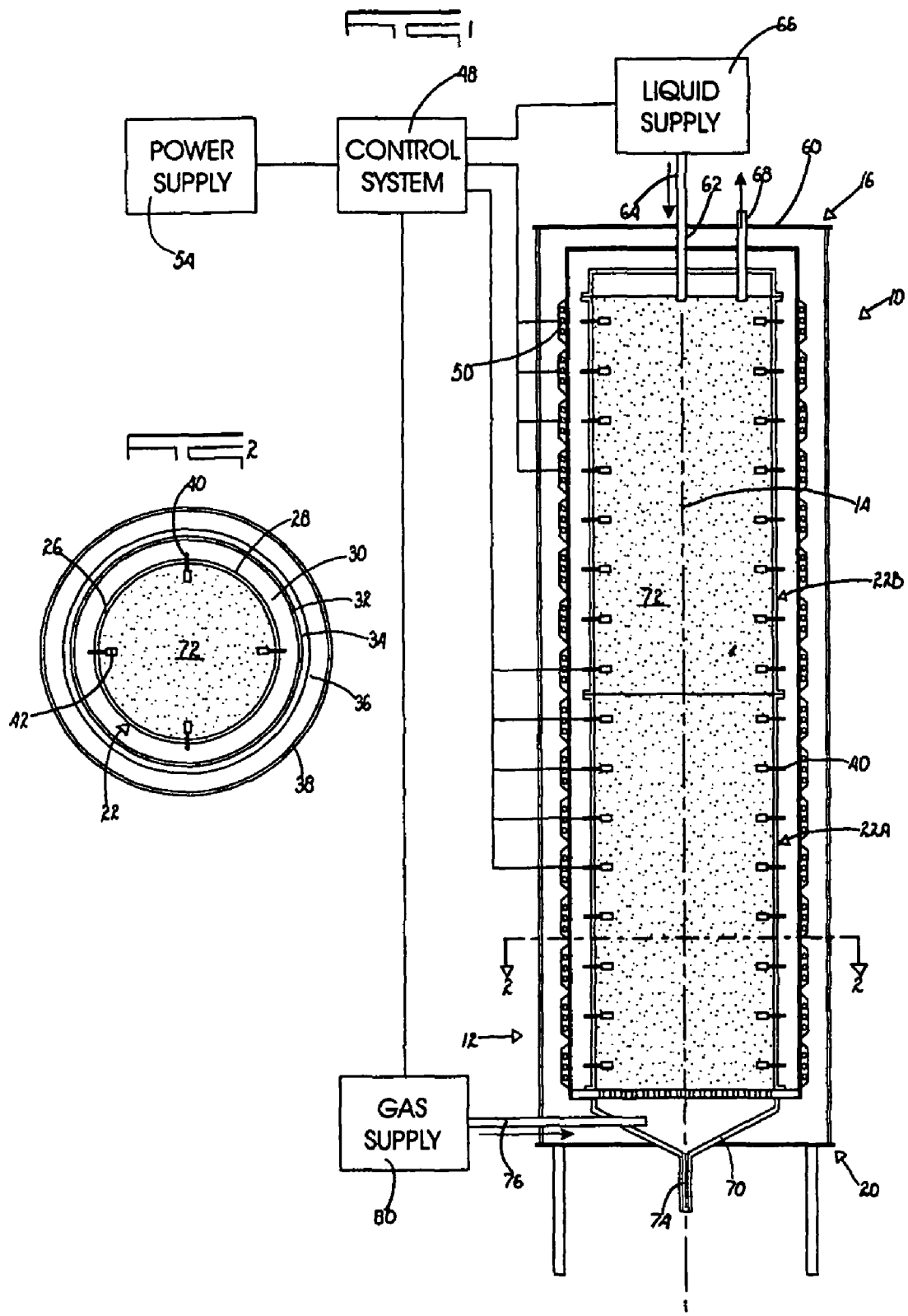

METHOD OF AND APPARATUS FOR SIMULATING A BIOLOGICAL HEAP LEACHING PROCESS

The present application claims priority to South African Provisional Patent Application No. 2003/9936 dated 23 Dec. 2003, the entire contents of which is incorporated herein by reference.

BACKGROUND OF THE INVENTION

This invention relates generally to the microbiological leaching of ore in a heap and is concerned, more particularly, with the simulation of certain aspects thereof.

In a microbiological heap leaching application mined ore is crushed and agglomerated with acid and nutrients. Oxygen and carbon dioxide are supplied to the ore to provide an environment for organism growth and to promote the oxidising conditions required for mineral degradation.

Normally the acidic solution is applied to the top of the ore heap and is allowed to percolate downwardly while the oxygen and carbon dioxide are supplied in the form of air introduced to the bottom of the heap. The air flowing upwardly and the acidic solution flowing downwardly, through the heap, are counter-current transport media which interact at different points of the heap allowing oxygen transfer, species migration and a heat exchange mechanism within the heap.

It is known that a heap leaching process is temperature-dependent with determining factors including the ore type and the microorganisms which are used for the leaching. For example, the acidic solubilisation of copper from copper oxide ores, chalcocitic ores and other secondary copper sulphide bearing ores, at low temperatures, may result in an acceptable recovery of the metal. On the other hand minerals such as enargite, carrollite and chalcopyrite are slow leaching at low temperatures (below 30° C.) and leaching at these temperature results in poor metal extraction which, in most instances, is uneconomical.

The enhanced oxidation of the sulphide components of minerals of the aforementioned type, by microbiological action, is an exothermic reaction which releases substantial amounts of energy, a process which must be correctly managed to obtain effective metal recovery.

It is difficult and expensive to monitor conditions inside a commercially operated heap due, primarily, to the size of a typical heap and the amount and type of material it contains.

SUMMARY OF THE INVENTION

The invention is concerned with simulating certain aspects of a microbiological heap leaching process.

The invention provides, in the first instance, apparatus for simulating a process in which ore, in a heap, is microbiologically leached, the apparatus including a housing in which material, representative of the ore, is microbiologically leached, a plurality of sensors for measuring the temperature of the material at each of a plurality of locations in the housing, and a control system which, in response to the temperature measurements from the sensors, controls heat loss from the material in the housing to atmosphere.

The housing may be of any appropriate shape and size but preferably is a tubular column. The column may be oriented so that it extends with its longitudinal axis vertical and with an upper and lower end.

The column may be made in any appropriate way and preferably is made from a plurality of modular components which are secured together. This enables the effective height of the column to be adjusted so that account can be taken of heaps of different depths.

The housing may include insulation for restricting heat loss from the housing.

The apparatus may include at least one heat source which is controlled by the control system and which raises the temperature of the housing, at least at one location, in a manner which depends on the temperature of the ore inside the housing.

The heat source may be of any appropriate kind but preferably use is made of a plurality of electrical elements each of which is separately controllable by the control system.

The column may be divided into a plurality of segments which extend adjacent each other in a vertical direction and the temperature of each segment may be controllable, to a substantial extent independently of the temperatures in adjacent segments. The segments may be physically or notionally distinct from each other.

The control system is preferably operated to minimise heat loss from the material in the housing to atmosphere. Ideally the heat loss is reduced to what, for practical purposes, is zero.

The apparatus may include a system for supplying an acidic liquid medium, on a controlled basis, to an upper end of the housing to simulate the act of irrigating an upper surface of a heap which is leached on a commercial basis.

The apparatus may include a system for supplying gas on a controlled basis to a lower end of the housing. This is done to simulate the supply of oxygen and carbon dioxide to a heap which is operated on a commercial basis.

The control system may be used to control the rate of supply, or composition, of the acidic liquid medium, and of the gas, to create at least one high temperature zone at a predetermined region in the housing, or to manipulate or vary at least one of the following: the temperature prevailing in such a zone, and the position of the zone within the housing.

The invention also extends to a method of simulating a process in which ore, in a heap, is microbiologically leached, the method including the steps of microbiologically leaching material, representative of the ore, in a confined volume, monitoring the temperature of the material, inside the volume, at each of a plurality of locations and, in response to the monitored temperatures, using a control system to control heat loss from the confined volume.

Preferably the control system is operated to reduce heat loss from the confined volume effectively to zero.

The control system may be used to control the operation of a plurality of independently operable heat sources which are positioned at predetermined locations relatively to the confined volume. This approach makes it possible to establish a controlled temperature gradient inside the material. In a variation of the invention the heat loss from the confined volume is reduced, effectively, to zero, and process parameters e.g. liquid and gas flows through the volume, are adjusted to produce at least one high temperature zone in the volume.

The method may include the step of varying the composition and flow rate of an acidic liquid medium and of oxygen and carbon dioxide gases, supplied to the ore, thereby to manipulate the position of a temperature zone in the material, and to modify the temperature of a given zone in the material.

BRIEF DESCRIPTION OF THE DRAWINGS

FIG. 1 is a cross sectional view, from one side, of apparatus according to the invention.

FIG. 2 is a cross sectional view of the apparatus in FIG. 1 taken on line 2-2 in FIG. 1.

DESCRIPTION OF PREFERRED EMBODIMENTS

The accompanying drawings illustrate apparatus 10 according to the invention which includes an elongate tubular column 12 which, in use, is oriented so that its longitudinal axis 14 extends vertically, and which has an upper end 16 and a lower end 20.

In this case the column has two tubular segments 22A and 22B respectively which are stacked one on the other and which are secured together using appropriate fasteners. This modular approach simplifies the manufacture of the column and allows the number of segments to be varied, according to requirement, to approximate heaps of different heights.

FIG. 2 is a cross sectional view of a typical segment 22. The segment includes a stainless steel tube 26 of an appropriate diameter, e.g., between 800 mm and 1200 mm which, on an inner surface, has a rubber liner 28 and, on an outer surface, layers 30 to 38 of insulating material, glass fiber and aluminum chosen, according to requirement, to provide an effective and strong insulating cover for the tube 26.

Each segment has a plurality of supports 40 which extend from an inner surface of the tube 26 into the interior of the tube. The segments are spaced from each other, in a vertical sense, at regular intervals according to predetermined criteria. Each support has a respective temperature sensor 42 fixed to it at its innermost end. The temperature sensors are independently connected to a control system 48 although only some of the connections are shown.

A plurality of independently controllable heating elements 50 are embedded in the insulating material surrounding the tube 26. Each element is independently connected to the control system 48, although only some of the connections are shown. The control system, in response to temperature measurements from the sensors 42, controls the supply of electrical power from a power source 54 to each element 50.

The upper end 16 of the column has a cover 60 and a tube 62 extends downwardly from the underside of the cover. A pipe 64, which leads to the tube, is connected to a liquid medium supply source 66 which is also under the control of the system 48. A gas exhaust vent 68 allows excess gas in the column to escape to atmosphere. The exhaust gas can if required be subjected to analysis, using suitable instruments (not shown), to obtain measures of its composition and of its temperature.

The lower end 20 of the column has a conical cover 70 which acts as a funnel for liquid which drains downwardly from the column, through ore material 72 in the column, and which includes an outlet 74 which can be directed to a facility (not shown) for analysis and processing of the collected liquid, when required. At least one pipe 76 extends into a volume inside the column, immediately above the cover 70, from a gas supply source 80. The supply of gas from the source 80 to the column is controlled by the system 48.

The column, in use, is filed with material 72, i.e. an ore sample, which is representative of ore which is to be leached in a commercial heap leaching operation. The liquid source 66 contains an acid solution, e.g., of sulphuric acid, at a pH which, again, is representative of the conditions which prevail in an industrial scale heap leach operation. A mixed microbiological culture of inoculum, also determined by prevailing conditions in a commercial operation, is added to the liquid. It is possible to use other techniques to deliver the inoculum. For example the inoculum can be added directly to the ore or it can be added using an aerosol-type delivery process.

The gas source 80, which typically is air, is used to introduce oxygen and carbon dioxide into the material 72. It is possible though to use separate oxygen and carbon dioxide sources in order to vary the oxygen and carbon dioxide proportions from the ratios which prevail in air.

As has been indicated in the preamble to this specification high temperature (i.e. high energy) zones are generated in an industrially operated heap which is microbiologically leached. The apparatus 10 is intended to simulate a notional pillar of ore in a heap, detect the high temperatures zones in the pillar, control heat loss from the notional pillar effectively to zero, and provide a mechanism whereby the positions of the zones can be manipulated by varying process parameters (e.g. the liquid and gas flow rates, and the compositions thereof) so that the energy which is generated by the exothermic sulphide oxidation reactions can be managed to establish effective leaching conditions.

The enhanced oxidation of sulphide sulphur by microbiological action is an exothermic reaction which releases heat energy of the order of 2500 kJ/kg of sulphide sulphur oxidised. Although the quantity of heat which is released in a commercial heap is substantial the conditions which prevail in a notional vertical pillar taken through the heap are largely independent of the conditions prevailing elsewhere in the heap primarily due to the insulating effect of the substantial amount of ore which surrounds the pillar. The invention is concerned with simulating the operation of a pillar of this type.

The microbiological leaching reaction is represented by the following overall chemical and enzymatic equations:

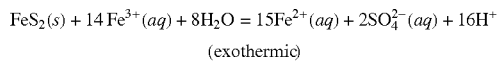

(exothermic)

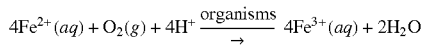

Carbon dioxide (or another suitable carbon source or sources)+energy (from reduced S or Fe)+ oxygen→organisms (growth and viability)

Each type of microorganism is suited for a specific temperature range and the environmental temperature dictates the type of microorganism active at any time. The microorganisms are selected based on the activity levels in defined temperature ranges. In order to work in the range of 15° C. to 45° C. the organisms can be selected from the following genus groups: *Acidithiobacillus* (formerly *Thiobacillus*); *Acidimicrobium*; *Sulfobacillus*; *Ferroplasma* (*Ferriplasma*); and *Alicyclobacillus*.

For efficient micro-organism operation at a higher temperature range e.g. from 45° C. to 55° C., suitable moderate thermophile micro-organisms can be selected from the following species: *Acidithiobacillus caldus* (formerly *Thiobacillus caldus*); *Acidimicrobium ferrooxidans*; *Sulfobacillus acidophilus*; *Sulfobacillus disulfidooxidans*; *Sulfobacillus thermosulfidooxidans*; *Ferroplasma acidarmanus*; *Thermoplasma acidophylum*; *Alicyclobacillus acidocaldrius*; and *Ferromicrobium*.

If higher temperature operation is required, say from 55° C. to 85° C., suitable thermophilic micro-organisms are used such as *Sulfolobus metallicus*; *Sulfolobus acidocaldarius*; *Sulfolobus thermosulfidooxidans*; *Acidianus infemus*; *Metallosphaera sedula*; *Ferroplasma acidarmanus*; *Thermo-*

*plasma acidophilum; Thermoplasma volcanium*; and *Picrophilus oshimae, Acidianus brierleyi*.

In use of the apparatus 10 a microbiological leaching process is initiated in the material 72 by irrigating the material from the source 66 and by supplying oxygen and carbon dioxide to the column from the source 80. The oxidation process gives rise to zones of different temperatures inside the material with the temperature of each zone being related to the leaching activity in the zone.

The temperature sensors 42 are used to measure the respective localised temperatures in the zones. Each temperature measurement is applied to the control system 48 which, in turn, controls the supply of electrical energy from the supply 54 to the various elements 50 to force the temperature gradient inside the column, in a transverse direction, at each of the segments which are being separately controlled, effectively to zero. This stops heat transfer out of the column to atmosphere.

The transfer of heat through an ore body, between two surfaces, is expressed, using Fourier's Law of heat transfer, by the following equation:

$$Q = k A (T_1 - T_2)/(X_1 - X_2)$$

where:
k is the thermal conductivity of the material (W/m/° C.);
A is the surface area of heat transfer (m$^2$);
T is the temperature of a respective surface (° C.);
X is the distance between the surfaces (m); and
Q is the heat transfer between the surfaces (W).

From an examination of this equation it is evident that Q tends to zero for $X_1 \gg X_2$. This is the case for a pillar of rock in a commercial heap which is a substantial distance from a boundary of the heap. In other words the heat loss from a notional pillar inside the heap is effectively zero.

It is also to be noted that Q tends to zero if $T_1 = T_2$. This property is used in the apparatus of the invention for, in any segment of the column 12, by matching the external temperature to the temperature in the corresponding portion of material inside the segment, the transfer of heat to atmosphere can be effectively eliminated, a feature which means that the leaching activity of the material inside the column essentially replicates leaching activity of a notional pillar inside a commercial heap.

By varying the compositions and the flow rates of the liquid and gas supplied to the material 72 from the sources 66 and 80 respectively it is possible to influence the leaching activity inside the column and thereby simulate leaching inside a commercially operated heap. The establishment, maintenance and variation of one or more relatively high temperature zones in the column can be effected by judicious control of the process parameters (gas and liquid compositions and flow rates) prevailing in the ore in the column. This is done in an interactive or feedback mode with the temperature control to ensure that heat loss from the column is at all times limited so that the column continuously behaves as a notional column in an industrial heap.

The compositions of the gas and liquid (i.e. the process parameters) are readily controlled by means of suitable valves (not shown) and flow meters-which feed information to the control system 48, or an alternative controller, which then acts on the valves. This type of control technique, which is known in the art and which is not further described herein, allows parameters, such as temperature, position and size, of at least one relatively high temperature zone in the column to be controlled or varied.

The apparatus of the invention can thus be used to simulate the situation prevailing within a heap in which a microbiological oxidation process takes place. The effect of varying gas and liquid flow rates to a heap on the temperature profile which prevails along the length of the notional column can be assessed and the temperature profile can be manipulated by changing the compositions and flow rates of the gas and liquid supplied to the heap.

The column design, instrumentation (temperature sensors) and control system (used to control the electrical elements and the compositions and flow rates of the gas and liquid supplied to the column i.e. the process parameters) allow an accurate determination to be made of the heat balance in the notional pillar of ore. It is then possible to obtain an accurate measurement of the rate at which heat energy resulting from the ore leaching activity, is released. This can be done, inter alia, by calculating the quantities of heat energy transferred to the gas and liquid streams as they traverse the ore pillar and by taking into account the electrical energy input to the ore pillar to keep the temperature gradient across the pillar effectively at zero. The heat balance determination constitutes a valuable parameter in a process model for heap leaching for it allows aspects of the model to be verified.

Of course, it should be understood that a wide range of changes and modifications could be made to the embodiments described above. It is therefore intended that the foregoing detailed description be regarded as illustrative rather than limiting, and that it be understood that it is the following claims, including all equivalents, that are intended to define the spirit and scope of this invention.

The invention claimed is:

1. A method of simulating a process in which ore, in a heap, is microbiologically leached, the method including the steps of microbiologically leaching material, representative of the ore, in a housing defining an enclosed, confined volume, monitoring the temperature of the material, inside the volume, at each of a plurality of locations to assess the leaching activity at each location and, in response to the monitored temperatures, separately controlling the operation of each of a plurality of heat sources which are positioned at predetermined locations within the confined volume to control heat loss from the confined volume effectively to zero.

2. A method according to claim 1 which includes the step of establishing a controlled temperature gradient inside the material.

3. A method according to claim 2 wherein the temperature gradient is established at least by controlling the supply or composition of gas or liquid to the confined volume.

4. A method according to claim 1 which includes the step of supplying an acidic liquid medium, on a controlled basis, to an upper end of the confined volume to simulate the act of irrigating an upper surface of a heap which is leached on a commercial basis.

5. A method according to claim 1 which includes the step of supplying gas on a controlled basis to a lower end of the confined volume.

6. A method according to claim 5 wherein the gas includes oxygen and carbon dioxide.

7. A method according to claim 1 which includes the step of manipulating the position of at least one temperature zone in the material in the confined volume.

8. A method according to claim 1 which includes the step of modifying the temperature of a given zone in the material.

9. A method of simulating a heap-leaching process which includes the steps of microbiologically leaching ore in a housing defining an enclosed confined volume, monitoring the temperature of the ore inside the volume, at each of a plurality of locations; and separately controlling the operation of each of a plurality of heat sources that are positioned at predetermined locations relative to the volume, in response to the respective monitored temperatures to control heat loss from the confined volume effectively to zero, and varying process parameters within the confined volume.

10. A method according to claim 9 wherein the process parameters are varied to control at least one of the following: the temperature of at least one relatively high temperature zone in the confined volume; and the position of at least one relatively high temperature zone in the confined volume.

11. A method of simulating a process in which ore, in a heap, is microbiologically leached, comprising: microbiologically leaching material, representative of the ore, in a housing that defines an enclosed, confined volume; monitoring the temperature of the material, inside the volume, at each of a plurality of locations; and, separately controlling the operation of each of a plurality of heat sources that are positioned at predetermined locations relative to the volume, in response to the respective monitored temperatures to control heat loss from the confined volume effectively to zero.

* * * * *